United States Patent [19]

Hagin et al.

[11] Patent Number: 4,897,996
[45] Date of Patent: Feb. 6, 1990

[54] LOW-LOSS CYCLICALLY-OPERATING PRESSURE-RESPONSIVE BYPASS VALVE FOR FIXED DISPLACEMENT PUMP FLOW CONTROL

[75] Inventors: Faust Hagin, Munich; Stefan Martini, Ulm, both of Fed. Rep. of Germany

[73] Assignee: MAN Nutzfahrzeuge GmbH, Munich, Fed. Rep. of Germany

[21] Appl. No.: 78,518

[22] Filed: Jul. 27, 1987

[30] Foreign Application Priority Data

Aug. 1, 1986 [DE] Fed. Rep. of Germany ....... 3626187
Apr. 14, 1987 [DE] Fed. Rep. of Germany ....... 3712716

[51] Int. Cl.$^4$ .......................... F15B 11/02; F15B 13/02
[52] U.S. Cl. ........................................ 60/468; 91/468; 137/116; 417/307
[58] Field of Search ................. 91/433, 426, 452, 468; 137/116; 417/311, 307; 60/468, 494

[56] References Cited

U.S. PATENT DOCUMENTS

| 2,406,899 | 9/1946 | Pugh et al. | 137/116 X |
| 2,545,712 | 3/1931 | Stevenson | 137/116 X |
| 3,718,373 | 2/1973 | Hofer | 60/494 X |
| 3,845,776 | 11/1974 | Ueda | 137/116 |
| 3,971,397 | 7/1976 | Staisch | 137/116 |
| 3,973,581 | 8/1976 | Chiba | 137/116 |
| 4,010,610 | 3/1977 | Dunn | 60/468 X |
| 4,173,866 | 11/1979 | Farr | 60/494 X |
| 4,302,937 | 12/1981 | Aubert | 137/116 X |
| 4,503,876 | 3/1985 | Farr | 137/116 X |
| 4,644,748 | 2/1987 | Goss et al. | 60/468 X |
| 4,711,155 | 12/1987 | Brunner | 91/452 X |

FOREIGN PATENT DOCUMENTS 2307351 8/1974 Fed. Rep. of Germany .

Primary Examiner—Robert E. Garrett
Assistant Examiner—George Kapsalas
Attorney, Agent, or Firm—Roberts, Spiecens & Cohen

[57] ABSTRACT

In a system for varying the output flow from a constant rate feed pump with low losses by chopping the said output flow into one flow fraction supplied to the load as a power flow and into another flow fraction returned as a pressureless flow, the loads are aperiodically supplied with proportionated amounts of fluid by chopping, the respective amounts of fluid and the chop frequency being inherently controlled in way dependent on the instantaneous requirement of the load in the system. The system for performing the method has a housing with a number of pressure spaces arranged to be acted upon by different flows and with one or more pressureless spaces, a piston with a piston rod arranged in a piston space, a compression spring preferably arranged in a hole in said piston rod and adapted to act against the sum of the hydraulic forces acting on the piston and spool. The method is applicable to complex hydraulic systems and more especially to hydrostatic drives.

14 Claims, 5 Drawing Sheets

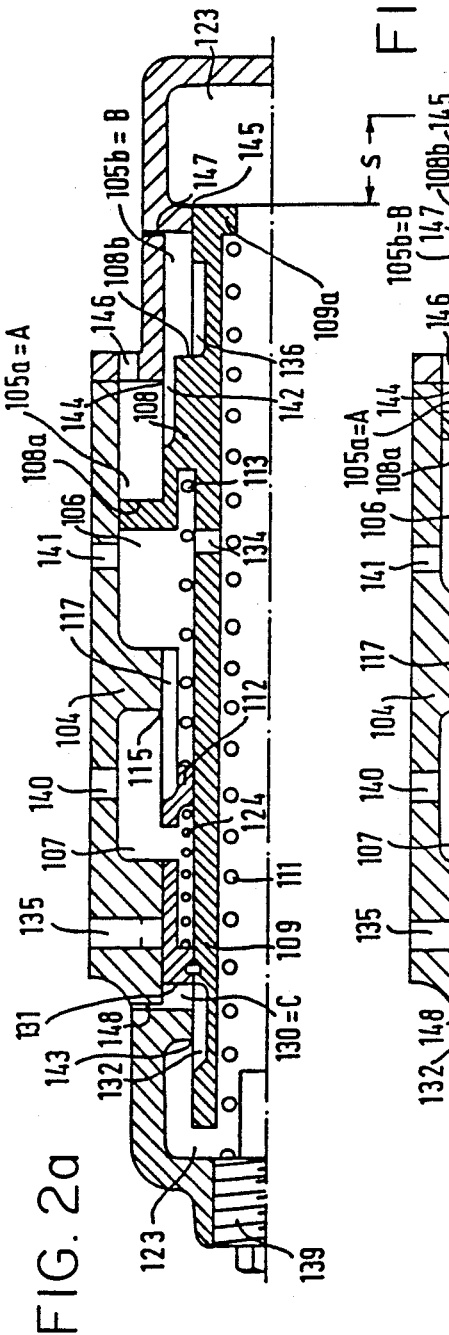
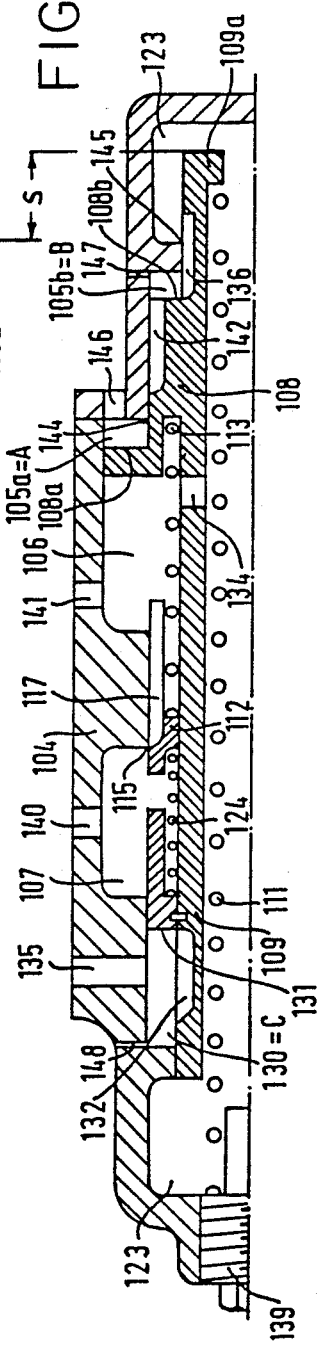
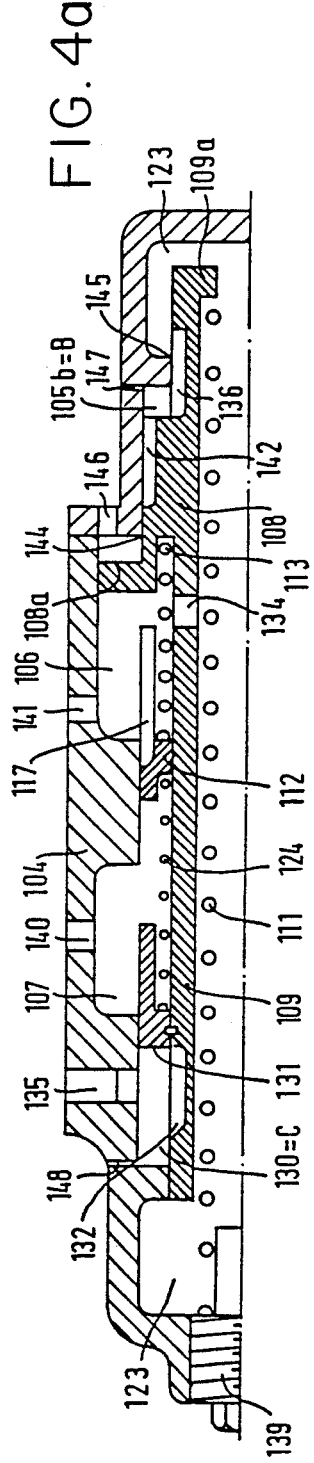

FIG. 4
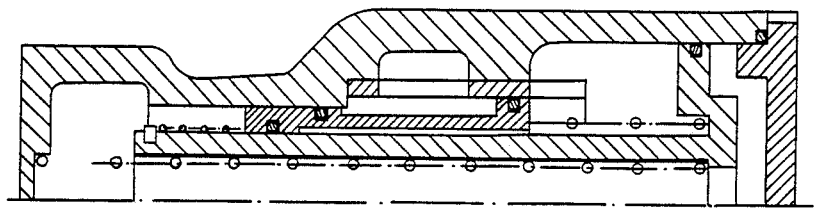
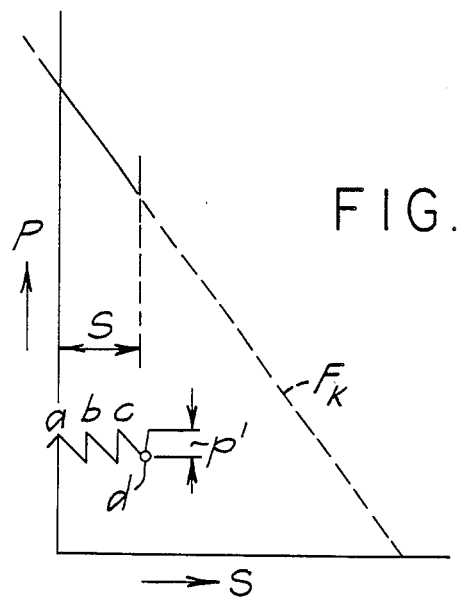
FIG. 5

LOW-LOSS CYCLICALLY-OPERATING PRESSURE-RESPONSIVE BYPASS VALVE FOR FIXED DISPLACEMENT PUMP FLOW CONTROL

BACKGROUND OF THE INVENTION

The invention relates to a low loss method and device for modifying the flow from a constant rate feed pump by chopping the flow into one fraction supplied as a power flow fraction to a load and into a further fraction returned under zero pressure.

The oil requirement arising in closed circuit hydrostatic systems is greatly dependent on the different settings of the equipment and on leakages, a fact that so far has been taken into account by the selection of a particularly large feed pump which is able to meet the maximum requirement of the load at a given feed pressure. In such a system, which is elaborate and expensive, the oil supply occurring in some phases which is not able to be used, is returned to the tank via a pressure limiting valve. This amounts to power dissipation leading to the production of heat in the system.

Another possibility which has heretofore been used is an arrangement with a number of coupled feed pumps corresponding to different supply rates which are able to be called upon as required. Although this arrangement is more economical as regards coping with consumption, it is more expensive than the first system and furthermore requires a pressure limiting valve.

A more elegant system is one in which the feed pump is an adjustable one, but however the costs are then very high and the overall size is large.

A proposal has been made in the German patent application No. P 23 07 351 in which the pump output flow is chopped up into separate portions of liquid, which are passed alternately into respective supply ducts, the pump output flow being chopped by way of a directional control valve in a system including a pulse generator whose pulses are preferably static and have steep flanks, the flow being controlled by varying the time pulse sequence. This method is based on an externally set chopping of the pump output flow by using a pulse geerator used as a clock and which performs a periodic apportionment of the pump output flow in accordance with criteria which are permanéntly established, such as the frequency and the amount of the fraction, without taking into account the instantaneous supply rate to the load. There is thus an adaptation in arbitrary dictated periods of time and thus no optimum adaptation of the fractions supplied by the constant rate pump to the actual requirement of the load. A further disadvantage of this system is that a valve spool selecting the various liquid output ports is acted upon by an operating piston, whose stroke is terminally limited by striking against the front and rear walls of its pressure space, which leads to an unacceptable level of staccato clicking noise and to a high wear rate on the operating members. Apart from this, the known control system requires one pulse generator, two solenoid valves and a pressure limiting valve so that it is high in price and furthermore has a substantial space requirement.

SUMMARY OF THE INVENTION

Accordingly one object of the invention is to develop an improved method making it possible for the loads to be supplied in accordance with their instantaneous needs from a constant feed rate pump.

A further aim of the invention is to devise such a method only involving low losses.

Furthermore the invention provides a device for performing the method.

A further object of the invention is to devise such a device which is low in price and economizes in space.

In order to achieve these or other objects, the load is aperiodically supplied with apportioned amounts of fluid by flow chopping, the respective amounts of fluid and the chop frequency being inherently controlled in a way dependent on the instantaneous requirement of the load in the system. It is in this way that it is possible to ensure a continuous adaptation to the oil requirement of the load, for example in a hydrostatic system, such requirement being dependent on various operating settings of adjustable pumps or motors on leakage.

The device for performing the method of the invention can comprise a housing with a number of pressure spaces able to be acted upon by different pressures and one or more pressure free spaces, a piston and piston rod arranged in the pressure space, a compression spring acting against the sum of the hydraulic forces on the piston, preferably arranged in a hole in the piston rod of the piston, and a spool which at one end bears via a compression spring against an end surface of the piston and has its other end acted upon by the system pressure and/or by a spring, so that a pressure-spring balance system is formed, the pressure space being, on the one hand, with the load and on the other hand via a check valve with the constant rate pump, the space being connected with the oil tank and the pressure space being connected with the constant rate pump, and the pressure spaces are able to be alternately connected with each other or shut off from each other on reaching an upper or lower pressure limit. It is more especially in connection with this device that in accordance with the method of the invention the respectively pumped quantity of oil is supplied on the basis of a pressure comparison (in which a pressure-spring balance functions as an important component of the invention) without the energy of excess oil having to be dissipated by a pressure limiting valve. The device in accordance with the invention may be made with a small size as an integrated system and takes up little space. It does not involve abutment against terminal stops so that the operation is quiet.

In accordance with the invention in the pressure spaces which may be connected and shut off by the spool there is a sleeve with circumferentially distributed holes extending along the one pressure space and with circumferentially distributed slots extending along the other pressure space. On the one hand this serves to ensure a reliable running or guiding of the spool with a supporting action on both sides, while on the other hand the sleeve having the holes and the slots makes it possible for the pressure spaces to be connected via the shear-action edge of the spool. This part, which may be simply produced on automatic lathes, makes a complex housing design unnecessary.

In accordance with one particular form of the invention there is an abutment, for example, a retaining ring, at the end of the piston rod to limit the motion of the stool, and between the spool and the abutment it is possible to have a supplementary damping member in the form of a spring. The abutment is more particularly required when starting the system before a pressure has been built up in order to order to limit the motion of the spool so that the spool shuts off the connection between the pump and the tank and enables the initial build up of pressure to take place.

In accordance with a further development of the invention the main pressure space may be connected with a hydraulic accumulator. In this arrangement the pressure space has its outlet connected with a larger amount of oil so that the frequency is decreased. This prolongs the working life of the device and the noise level is reduced.

In accordance with a further feature of the invention, following the pressure space the housing with its internal parts may be duplicated in a bilaterally symmetrical configuration; this system does not cause any vibration of adjacent parts.

A further development of the invention is possible in which in accordance with the position of the piston rod and the piston thereof and the two compression springs certain spaces may be joined together and separated from each other by slots and shear action edges. This part of the invention, which in some respects respresents an independent principle, is one in which in the housing there is a stepped piston connected with a piston rod consisting of a main piston in the pressure space (A) and an auxiliary piston in the pressure space (B), as well as a counter piston, firmly connected with the piston rod, in the pressure space (C) and in the hole in the piston rod there is a compression spring acting between the rear housing wall and the piston rod head, the pistons being acted upon by the load pressure against the force of the spring in the maximum compression range of the compression spring, in the medium compression range of the compression spring the pistons are jointly acted upon by load pressure against the force of the compression spring and against the force resulting from the load pressure acting on the counter piston and the minimum compression range of the compression spring only the main piston is acted against the force of the compression spring and against the force resulting from the load pressure acting on the counter piston. It is in this manner that it is possible to achieve additional and substantial advantages over the primary design, that is to say substantially lower pressure fluctuations, smooth running owing to longer strokes and more especially an operating frequency which is three times lower so that the system is generally relieved and the operating frequency may be kept somewhat under the resonant range of the compression spring. The system becmes less prone to disorders and has a longer working life.

As part of a further feature of the invention there is a setting screw in the rear housing wall on whose collar the compression spring bears with an adjustable biasing action. This possibility of adjustment for the spring biasing effect makes it possible to vary the minimum or maximum feed pressure.

For changing over communicating pressure spaces from the under pressure condition to the pressure free condition and vice versa there are relief holes which are secured by check valves and are connected with the load. In this manner it is possible to preclude the spaces B and C from being shut off in the transitional phases and prevent the device from being locked.

Further features and advantages of the invention will be seen from the following description of one embodiment thereof and the drawings.

BRIEF DESCRIPTION OF THE DRAWINGS

FIGS. 2 to 4 show further working positions of the device.

FIGS. 2a to 4a show further working positions thereof.

FIG. 5 is a graph of pressure against displacement.

DETAILED DESCRIPTION OF THE PREFERRED EMBODIMENTS

Figure 1:
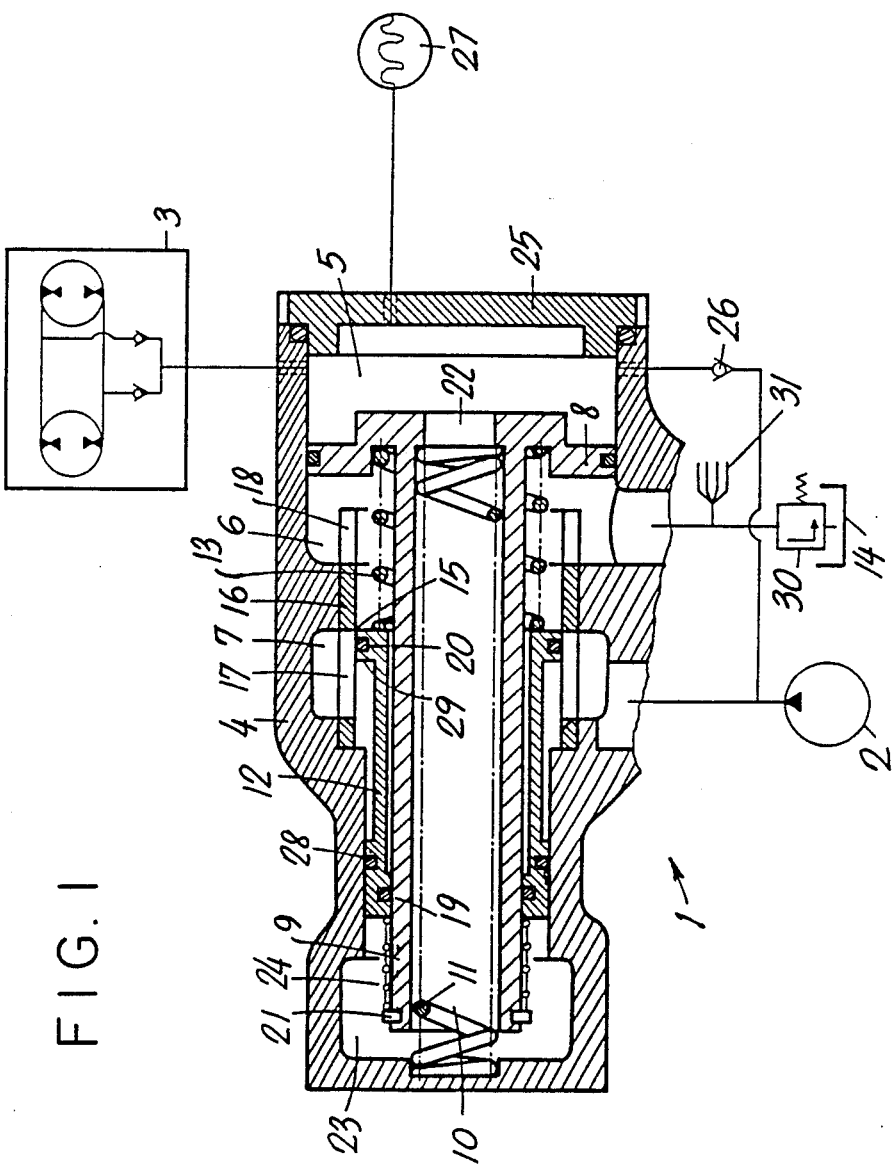
FIG. 1 shows a device embodying the invention in section and in a first working position thereof.

FIG. 1 shows a device 1 with an associated constant rate pump 2, a load 3, a tank 14 and a hydraulic accumulator 27. The housing 4 of the device 1 has a pressure space 5 which is closed by a cover 25 and is connected both with the load 3 and, via a check valve 26, with the constant rate pump 2. A piston 8 is arranged in the pressure space 5, which is in the form of a cylinder, so that it may reciprocate in the longitudinal direction. The piston 8 is connected with a piston rod 9 extending into the rear pressure space 23. The pressure spaces 5 and 23 are connected together, so as to form zones of equal pressure, by a hole 22 in rod 9 and a further hole 10 in rod 9 connected to hole 22. A compression spring opposes the system pressure in the pressure space 5, one end of the spring bearing against the annular zone at the end of the hole 10 and the other end thereof bearing against the rear wall of the housing 4. There are further pressure chambers 6 and 7 in the housing 4 to the left of the piston 8, one chamber 6 being connected with the tank 14 and the other chamber 7 being connected with the constant rate feed pump 2. A sleeve 16 is interference fitted into a cylindrical hole in the housing 4 in the vicinity of the pressure chambers 6 and 7. Adjacent to the pressure chamber 7 the sleeve 16 has holes 17 and adjacent to the pressure chamber 6 it has slots 18 which are circumferentially distributed. Between a rear cylindrical part of the housing 4 and the circumferential surface of the piston rod 9 there is a longitudinally sliding spool 12, able to be borne either in the cylindrical hole or on the circumferential surface of the piston rod. The seal 19 serves to provide a sealing action between spool 12 and the circumferential surface of the piston rod 9, the seal 20 provides a sealing action between spool 12 and the non-interrupted parts of the sleeve 16, and the seal 28 acts on the rear cylindrical hole in the housing 4. Between the front end wall of the spool 12 and the back side of the piston 8 a spring 13 is held compressed. At the end part of the piston rod 9 there is an abutment 21 such as a retaining ring. Between the latter and the rear end surface of the spool 12 there is a weak springn 24. The shear edge 15 on the spool 12 serves to close off or open up the pressure space 7 so that sudden changes in the pressure forces on at least one end surface of the spool 12 are produced, this leading to abrupt movements of the spool to the right or to the left.

Figure 1A:
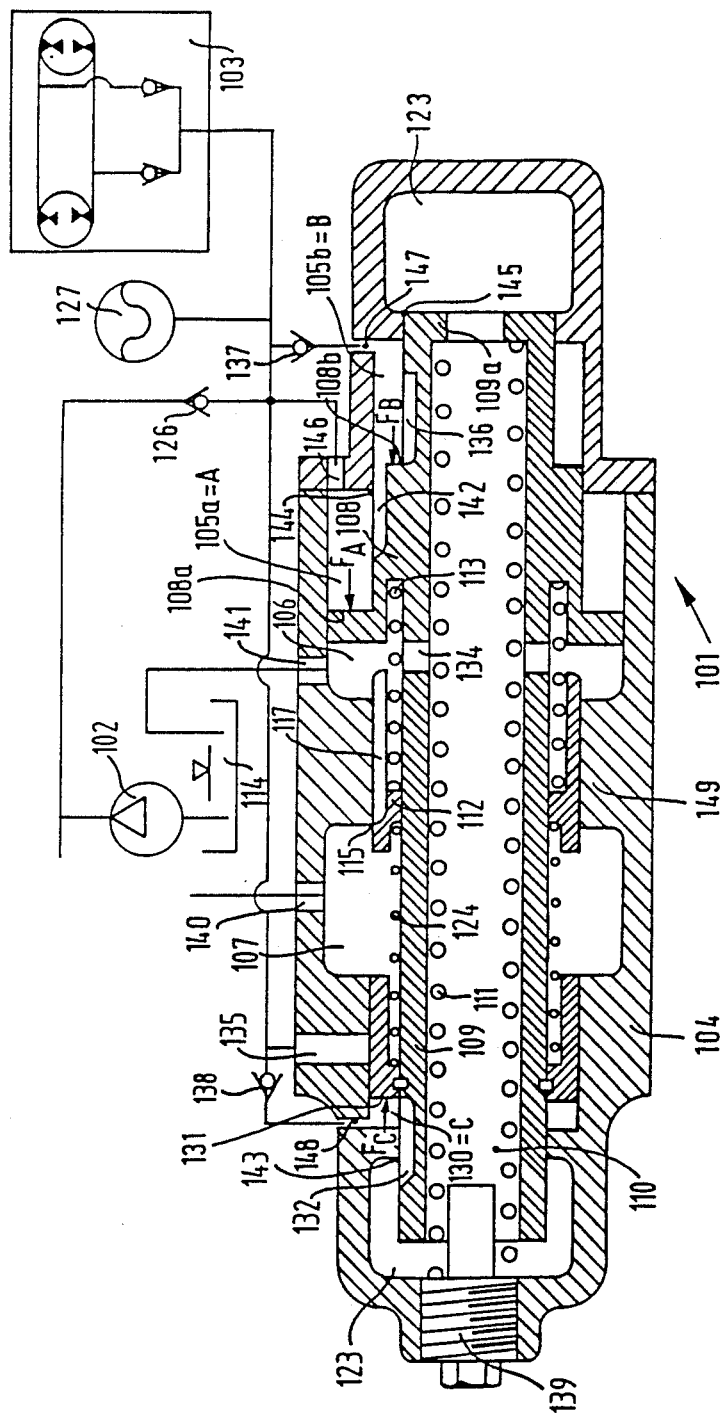
FIG. 1a shows a modified form of the device of the invention in section in a first working position thereof.

FIG. 1a shows a particularly advantageous modification 101 of the device in accordance with the invention with an associated consistant rate feed pump 102, a load 103, an oil tank 114 and a hydraulic accumulator 127. A piston rod 109 with a stepped piston 108 thereon at one end is able to move longitudinally in translation in the housing 104 of the device 101. At the other end of the piston rod 109 there is an opposing piston 131. The stepped piston 108 consists of the main piston 108a and the additional piston 108b. Together these two pistons and the suitably stepped wall or bore of the housing 104 define the pressure spaces 105a=A and 105b=B. On the outer circumference of the piston rod and in the rear part associated with the pressure space 105a there is one or more circumferentially distributed slots 142 whose exits will be aligned with the shear edge 144 on the stepped housing 104 on longitudinal displacement of the piston rod. Furthermore on the outer circumference of the end part of the piston rod and in the part associated with the pressure space 105b there are one or more slots 136 whose limit on the right hand side is aligned with the shear edge 145 of the further stepped housing 104 when the piston rod is longitudinally displaced. In the left hand rear part of the piston rod 109 there is an opposing piston 131 which is secured to the piston rod, for example by a retainer ring. This opposing piston cooperates with the housing 104 (which at this position is stepped) in defining a pressure chamber 130=C. Adjacent to the pressure chamber 130 there are slots 132 in the piston rod 109, whose outlet comes into alignment with a shear edge 143 of stepped housing 104 when the piston rod is moved in the direction of its length. In the central part of the housing 104 the latter has a restriction 149 which cooperates the left hand wall of the housing and with the piston rod 109 in defining a pressure space 107 and with the main piston 108a and the piston rod 109 forms a pressure space 106. Between the restriction 149 and the outer surface of the piston rod a longitudinally moving spool 112 is arranged whose outer surface has slots 117 therein whose outlet comes into alignment with the shear edge 115 located on the left hand wall of the restriction 149 when the spool is moved longitudinally. On its right hand side the spool has a machined recess in which compression spring 113 is held whose other end bears in a rear recess in the main piston 108a. On the other side of the spool 112 the latter has a recess containing a substantially weaker compression spring 124 whose other end bears in a recess in the opposing piston 131. A compression spring 111 runs in a hole 110 in the piston rod 109, which at one end bears against a piston rod head 109a and at its other bears against a collar on a set screw 139 inserted into the other left hand wall of the housing 104. In the two end parts of the housing 104 there are pressurefree spaces 123, which are connected together via a hole 110 in the piston rod 109. The oil tank 114 is connected via a hole 141 with the pressureless space 106 and the latter is connected via a hole 134 with the hole 110 and thus with the spaces 123. The pump 102 is connected or connectable with the pressure space 107 via a hole 140 and the other end (via a check valve 126) with the load 103 and via a hole 146 with the pressure spaces 105a and, respectively, 105b. There is furthermore a connection including a hole 135 leading to the pressure space 130. By way of relief holes 148 and 147 the pressure spaces 130 and 105b are connected through check valves 138 and 137 with the load 103. The spaces 130 and 123 are connected and disconnected by slots 132, the spaces 107 and 106 are connected and disconnected via slots 117, the spaces 105a and 105b are connected and disconnected via slots 142, the spaces 105b and 123 are connected and disconnected via the slots 136, such connection and disconnection being in a manner dependent on the position of the piston rod 109 and involving connection with the respective piston and mutual shutting off of the spaces from each other.

In certain cases it is appropriate to arrange a low pressure limiting valve 30 in the connection with the space 6 and the oil tank 114 in order to ensure a slight excess pressure for the supply of a part of the oil to low pressure loads, as for example lubrication points 31.

FIGS. 1 through 4 illustrate the significant operational states of the device in accordance with the invention.

In the state shown in FIG. 1 the constant rate feed pump 2 pumps into the pressure space 5 at maximum pressure until the piston 8 is displaced from its right hand end position so far to the left that the shear edge 15 of the spool 12 entrained by the spring 13 just frees the holes 17 so that there is now a connection with the pressurefree space 6, connected with the tank 14. The consequence of this is that the feed pump 2 now pumps directly into the tank 14 via the pressure space 7 and the annular space 6.

Figure 2:
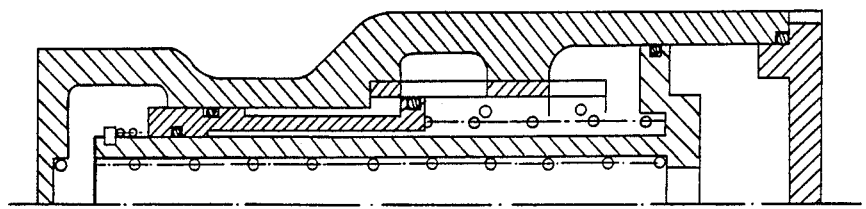

In the condition shown in FIG. 2 the sudden pressure drop in the pressure space 7 leads to a lesser degree of resistance to the extension of the spring 13 so that the spool 12 shoots to teh left until there is an equilibrium between the residual force of the spring 13 and the opposing pressure, acting on the end face of the spool and the spring 24. The weak spring 24 prevents a hard, metal-on-metal impact of the spool 12 on the abutment 21 when the system is started up.

Figure 3:
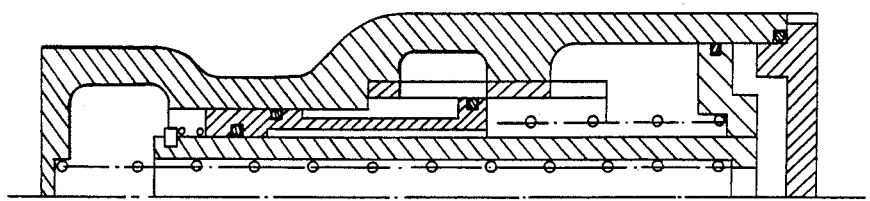

In the condition shown in FIG. 3 a further pressure drop in the pressure spaces 5 and 23 causes the piston 8 to be moved so far to the right, with entrainment of the spool a proportional amount owing to the spring 24, that the shear edge 15 again separates the pressure spaces 6 and 7 from each other.

FIG. 4 shows the shutting of the connection of the pressure spaces 6 and 7 so as to cause a sudden rise in the pressure in the pressure space 7, the oil pressure then taking effect on the annular surface 29 which is larger than the rear end surface. The consequence of this is that the spool shoots to the right until there is equilibrium with the opposing force of the spring 13. Although the pressure in the pressure chambers 5 and 7 increases simultaneously, owing to the effect of the spring 11 on the piston 8 it is not possible to expect an opposing motion of the piston 8 in the time required for displacement of the spool 12 to the right. After this short time however the pressure on the piston 8 increases so that it is moved to the left until it reaches its terminal position as shown in FIG. 1 (this being accompanied by a distance-proportional entrainment of the spool 12) and the oscilation cycle is thus terminated.

The following description of the movements is not in every case strictly related to the figures noted by number and does include intermediate stages.

In FIG. 1a the constant rate pump 102 has been pumping into the pressure space 105a=A (at maximum pressure) until the piston 108 (=108a+108b) has been so far displaced from its right hand end position to the left that the spool 112 as moved by the spring 113 is in such a position that its shear edge 115 just frees the slots 117 so that there is a connection with the pressurefree space 106 connected with the oil tank 114. The outcome of this is that the feed pump 102 now pumps directly into the oil tank 114 via the pressure space 107 and the space 106. The pressure space 105a (=A) is connected with the pressure space 105b (=B) via the slots 142 and the two are thus subjected to the pressure due to the compression spring 11. Since the pressure space 130 (=C) is then in communication via the slots 132 with the pressurefree space 123, the axial forces $F_A$ and $F_B$ from the pressure spaces A and B are in equilibrium with the coaxial spring force $F_{Kmax}$. Thus the equation $F_A+F_B=F_{Kmax}$ applies.

In the position in FIG. 2a the sudden pressure drop in the pressure space 107 causes a smaller force to oppose the extension of the spring 113 so that the spool 112 shoots so far to the left that there is an equilibrium between the residual force of the spring 113 and the force of the weaker spring 124. The piston rod 109 with the piston thereon begins to move to the right owing to the action of the spring 111. The load 103 will then, for the present, continue to be supplied with oil under pressure from the pressure spaces 105a and 105b. While this motion is taking place with intermediate phases that are not indicated in the center part of the stroke s the connection of the pressure space 133 (=C) with the pressureless space 132 is also interrupted by the covering over of the slots 132 and via the hole 135 a connection with the load pressure is produced so that in this manner, assuming that the pistons have the same areas, there will be an equilibrium between the pressure spaces 105b (=B) and 130 (=C) so that the equation $F_A=F_{Kmean}$ will apply (in which $F_{Kmean}$ is the mean stroke of the spring 111).

In the position shown in FIG. 3a any further drop in the pressure in the pressure spaces 105a and 105b leads to the piston 108 moving so far to the right that the shear edge 115 shuts off the spaces 106 and 107 from each other again. While the pressure space 130 (=C) is again under pressure, the communication between the pressure spaces 105a (=A) and 105b (=B) is cut off by the action of the shear edge 144 and at more or less the same time the connection between the pressure space 105b and the pressureless space 123 is brought into being so that the equation $F_A=F_{Kmin}+F_C$ is fulfilled, in which $F_{Kmin}$ denotes the terminal range rather than the terminal point.

In the position in FIG. 4a the closing of the connection between the spaces 106 and 107 causes a sudden increase in the pressure in the pressure space 107, the oil pressure acting on the annular area of the spool 112 and the latter abruptly moves to the right till there is equilibrium with the opposing force of the compression spring 113. $F_C$ is not compensated for by the force acting on the rear face of the opposite piston resulting from the pressure in the pressure space 107. However the force $F_C$ continues to act in the system, it being derived from the force which acts on the spool 112 and is transmitted via the spring 113 on to the rear faces of the main piston 108a. With its piston the piston rod 109 is moved to the left, the spool 112 being entrained a proportional distance, until it reaches its end position as indicated in FIG. 1a so that an oscillation cycle has come to an end, the equation $F_A=F_{Kmean}$ being again fulfilled in the middle of the stroke or the change in pressure as dependent on the stroke s is repeated in the reverse direction, see also FIG. 5.

The following formula is to be used for the design of the spring:

$$F_{Kmax}-F_{Kmin}=F_A+F_B-(F_A-F_C)=F_B+F_C$$

It is not necessary for the maximum end positions to be reached in every oscillation cycle and in fact the system may have any amplitude in accordance with the oil rate required by the load.

The following conditions are possible:

1. At maximum oil requirement of the load the system does not oscillate. The connection between the pressure spaces 6, 106, on the one hand and 7, 107 or the other is permanently interrupted.

2. The load does not indicate that it requires oil. The connection between the pressure spaces 6, 106 and 7, 107 is open all the time. The system is not pressurized and does not oscillate.

3. A varying and differing oil requirement occurs. The system is constantly excited by varying oscillations and gradually approaches the respective requirement.

What is claimed is:

1. A system for varying the output flow from a constant rate feed pump with low losses by chopping the output flow into one flow fraction supplied to the load as a power flow and into another flow fraction returned as a pressureless flow characterized in that the load is aperiodically supplied with proportionated amounts of fluid by chopping, the respective amounts of fluid and the chop frequency being inherently controlled in dependence on the instantaneous requirement of the load, said system comprising:

a housing provided with a number of pressure spaces arranged to be acted upon by different flows and with at least one pressureless space, a piston arranged in a piston space, said piston space being a first of said pressure spaces, said piston including a piston rod secured thereto, a compression spring arranged in a hole in said piston rod and adapted to act against the sum of the hydraulic forces acting on the piston, a spool having opposite end faces, a spring bearing on one end face of the piston and pressure means acting on the other end face of the spool, so as the constitute a system dependent on the relationship between the spring force and the hydraulic force, said piston space being connected on the one hand to a load and on the other hand to the constant rate pump via a check valve, a second pressure space being connected to an oil tank and a third pressure space being connected with the constant rate pump, and means for alternately connecting the second and third pressure spaces together and for separating them on attainment of an upper or lower permissible pressure limit.

2. The apparatus as claimed in claim 1 comprising a sleeve in the pressure spaces, said sleeve having circumferentially spaced apertures extending along the second and third pressure spaces.

3. The apparatus as claimed in claim 2 wherein said spool is arranged on the piston rod and in the housing with a sliding and sealing contact therewith, seals being provided on the piston and on the housing.

4. The apparatus as claimed in claim 3 comprising an abutment on an end of the piston rod for limiting movement of the spool.

5. The apparatus as claimed in claim 4 wherein the second pressure space is connected by first and second holes with a further space provided at an end of the housing.

6. The apparatus as claimed in claim 5 comprising a further spring between the spool and the abutment.

7. The apparatus as claimed in claim 6 wherein the first pressure space is connected with a hydraulic accumulator.

8. The apparatus as claimed in claim 7 wherein the spool has one end with a a shear edge of the spool larger than at an opposite end thereof.

9. The apparatus in accordance with claim 1 wherein said piston is stepped and includes a main piston in a first part of said piston pressure space, an additional piston in a second part of said piston pressure space, and a counter piston, also secured to the piston rod, in a fourth pressure space, and a second compression spring arranged in the hole in the piston rod between said rear housing wall and a head of said piston rod, and wherein
- in the maximum compression range of the second compression spring the main piston and the additional piston are jointly acted upon by the load pressure,
- in the medium pressure compression range of the second compression spring the main and additional pistons are acted upon by the load pressure against the force of the second spring and the force resulting from the load pressure acting on the counter piston, and
- in the minimum compression range of the second compression spring only the main piston is acted upon by the load pressure against the force of the second compression spring and against the force resulting from the load pressure acting on the counter piston.

10. The apparatus as claimed in claim 7 wherein a pressure space bounding said counter piston is
- connected and disconnected from said further space via slots and a shear edge (143) provided in said piston rod,
- said second and third spaces being connected and disconnected from each other via slots and a shear edge provided in said spool,
- first and second parts of said piston space being conneted and disconnected from each other via slots in said piston rod and a shear edge on said housing and
- the second part of said piston space and said further space are connected and disconnected via further slots in said piston rod and a further shear edge on said housing, in a way dependent on the position of the piston rod and the piston thereof, of the second compression spring and of a third compression spring.

11. The apparatus as claimed in claim 10 wherein the pressure space bounding the counterpiston is temporarily connected by a hole in the housing with the load, said fourth pressure space is connected with the constant rate pump via a hole in the housing, said pressureless space is connected with the oil tank, the first part of the piston pressure space and temporarily the second part thereof are connected via a hole in the housing with the constant rate pump and the load and said pressureless space is able to be connected via a hole in the piston rod with said further space.

12. The apparatus as claimed in claim 11 wherein in order to preclude locking of the piston rod with the piston thereof on changing connections and changing between pressurized and non-pressurized conditions of the pressure space bounding the counter piston and and said further space and of the first and second parts of the piston space via check valves, check-valved relief holes are connected with the load.

13. The apparatus as claimed in claim 12 comprising a set screw in the rear wall of the housing, said screw having a collar engaging the second compression spring for setting the same.

14. The apparatus as claimed in claim 13 wherein during a piston stroke there are at least three pressure maxima with the amplitude ($P^1$), in which a is the position in which said spool is displaced to free the associated slots so that said pressureless space and said fourth space are connected, b is generally the position in which said further space is closed, c is generally the position in which the first part of the piston space is shut off from the second part thereof and d is generally the position in which the pressureless space is disconnected from said further space.

* * * * *